United States Patent
Honaga et al.

(12) 
(10) Patent No.: US 6,491,130 B1
(45) Date of Patent: Dec. 10, 2002

(54) ELECTRIC POWER STEERING APPARATUS

(75) Inventors: Susumu Honaga, Aichi-ken (JP);
Yoshiharu Inaguma, Nagoya (JP);
Osamu Watanabe, Okazaki (JP);
Yoshinori Suzuki, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/460,414

(22) Filed: Dec. 14, 1999

(30) Foreign Application Priority Data

Dec. 14, 1998 (JP) ............................ 10-254079

(51) Int. Cl.$^7$ .............................. B62D 5/04; F16H 1/16
(52) U.S. Cl. ......................................... 180/444; 74/425
(58) Field of Search ............................. 180/444, 443, 180/446; 74/425, 388 PS, 500

(56) References Cited

U.S. PATENT DOCUMENTS

| | | | |
|---|---|---|---|
| 5,445,237 A | * 8/1995 | Eda et al. | 180/444 |
| 5,445,238 A | * 8/1995 | Chikuma et al. | 180/444 |
| 5,450,916 A | * 9/1995 | Budaker et al. | 180/444 |
| 5,454,438 A | * 10/1995 | Chikuma | 180/444 |
| 5,482,182 A | * 1/1996 | Takaoka et al. | 180/444 |
| 5,878,832 A | * 3/1999 | Olgren et al. | 180/444 |
| 5,899,294 A | * 5/1999 | Shimizu et al. | 180/444 |
| 6,076,628 A | * 6/2000 | Pattok et al. | 180/444 |
| 6,116,372 A | * 9/2000 | Mukai et al. | 180/444 |
| 6,155,376 A | * 12/2000 | Cheng | 180/444 |
| 6,176,148 B1 | * 1/2001 | Zhang et al. | 74/425 |

* cited by examiner

*Primary Examiner*—Ane Marie Boehler
*Assistant Examiner*—Matthew Luby
(74) *Attorney, Agent, or Firm*—Oblon, Spivak, McClelland, Maier & Neustadt, P.C.

(57) ABSTRACT

An electric power steering apparatus is composed of a wheel gear connected with a steering wheel, a worm shaft tooth-engaged with the wheel gear, and an electric motor rotatably driving the worm shaft in which a worm tooth portion of the worm shaft is formed with a compound lead. Further, the worm shaft is fixed in an axial direction by at least one locknut provided at a portion of a separate side of the electric motor. Further, one end of the worm shaft is rotatably supported through a ball bearing and is fixed by the locknut in the axial direction of the worm shaft, and the other end thereof is rotatably supported through another ball bearing or is fixed by a circlip through a disc-shaped spring in the axial direction. Furthermore, only respective outer rings of the ball bearings are further secured to a housing in which the worm shaft and the wheel gear are disposed.

6 Claims, 4 Drawing Sheets

ELECTRIC POWER STEERING APPARATUS

BACKGROUND OF THE INVENTION

1. Field of the Invention

The present invention relates to an electric power steering apparatus, more particularly, to a shape of a worm tooth portion in a worm wheel mechanism constructing a power assist section used in such an electric power steering apparatus.

2. Description of the Related Art

Generally, in an electric power steering apparatus having a power assist section driven by an electric motor, there is used a worm wheel mechanism as disclosed in Japanese Patent Publication (Kokai) No. 9-221045 (published on Aug. 26, 1997). With the adoption of such a worm wheel mechanism, an amplified assist power from the electric motor by the worm wheel mechanism is transmitted to a power steering apparatus. On the other hand, a load reaction force (kickback force) is not transmissively returned to a steering wheel through the worm wheel mechanism.

In the worm wheel mechanism of such an electric power steering apparatus thus-constructed above, it is required such that a backlash between a worm shaft and a wheel gear is restrained to be under a predetermined value, in order to obtain a predetermined feeling of a steering operation during a power assist operation in such an electric power steering apparatus. To reduce this backlash, it however is necessary to machine in high accuracy each of tooth portions and to maintain an axial distance between the worm shaft and the wheel gear accurately. As a result, this causes to increase a manufacturing cost.

SUMMARY OF THE INVENTION

Accordingly, an object of the present invention, to solve the above mentioned problem, is to provide an electric power steering apparatus that is capable of smoothly transmitting a torque through a worm wheel mechanism in which a compound lead is adopted on a worm tooth portion to reduce a backlash therein during a rotational operation of a worm wheel.

Briefly, an electric power steering apparatus according to the present invention is composed of a wheel gear connected with a steering wheel, a worm shaft tooth-engaged with the wheel gear, and an electric motor rotatably driving the worm shaft in which a worm tooth portion of the worm shaft is formed with a compound lead. Further, the worm shaft is fixed in an axial direction by at least one locknut provided at a portion of a separate side of the electric motor.

With this configuration, before the worm shaft is fixed in the axial direction by the locknut, the worm shaft is moved in the axial direction by an extremely small distance so as to optimize a backlash between the worm tooth portion of the worm shaft and the wheel gear. Thus, the worm shaft is moved only in the axial direction, so that an amount of the backlash can be adjusted to an optimized value without changing of an axial distance between the worm shaft and the wheel gear. Thereafter, the worm shaft is fixed in the axial direction by the locknut under condition that the backlash is maintained in the optimized value. Besides, such a tooth-engagement of the worm shaft with the wheel gear can be established on an entire tooth portion of the wheel gear, so that a torque transmission can be smoothly performed from the electric motor through the worm shaft to the wheel gear.

Further, one end of the worm shaft is rotatably supported through a ball bearing and is fixed by the locknut in the axial direction of the worm shaft, and the other end thereof is rotatably supported through another ball bearing and is fixed by a circlip through a disc-shaped spring in the axial direction.

According to this configuration, the worm shaft is positioned in the axial direction thereof under condition that the backlash is maintained in the optimized value. In such a situation, the worm shaft is urged by the disc-shaped spring and therefore, it is fixed under a condition that an axial force of the worm shaft is balanced. As a result, a position of the worm shaft can be maintained to be an optimized value of the backlash close to zero.

In the configuration described above, only respective outer rings of the ball bearings are further secured to a housing in which the worm shaft and the wheel gear are disposed. With this configuration, an attachment span between the both ball bearings can be diminished to be a distance close to a length of the worm tooth portion.

Further, a gear tooth portion of the wheel gear is formed with an ordinary lead that is not the compound lead. In the configuration described above, the machining on the gear tooth of the wheel gear can be facilitated.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment according to the present invention will be explained hereinafter with reference to FIGS. 1–4.

Figure 1:
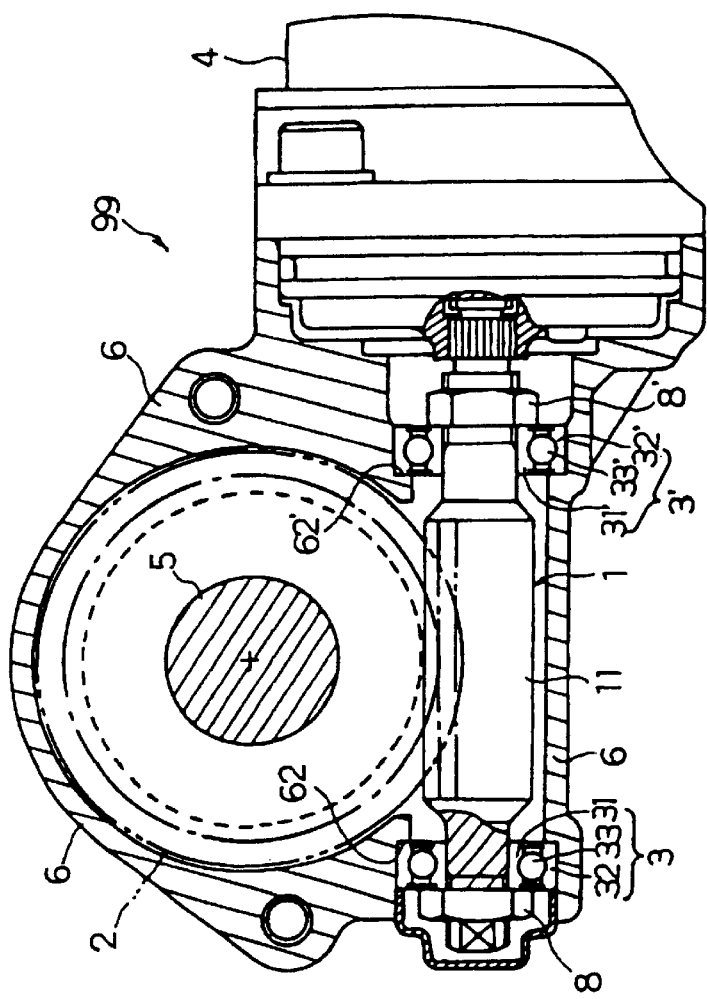
FIG. 1 is a cross-sectional view showing an entire construction of a worm wheel mechanism according to an embodiment of the present invention.
Figure 4:
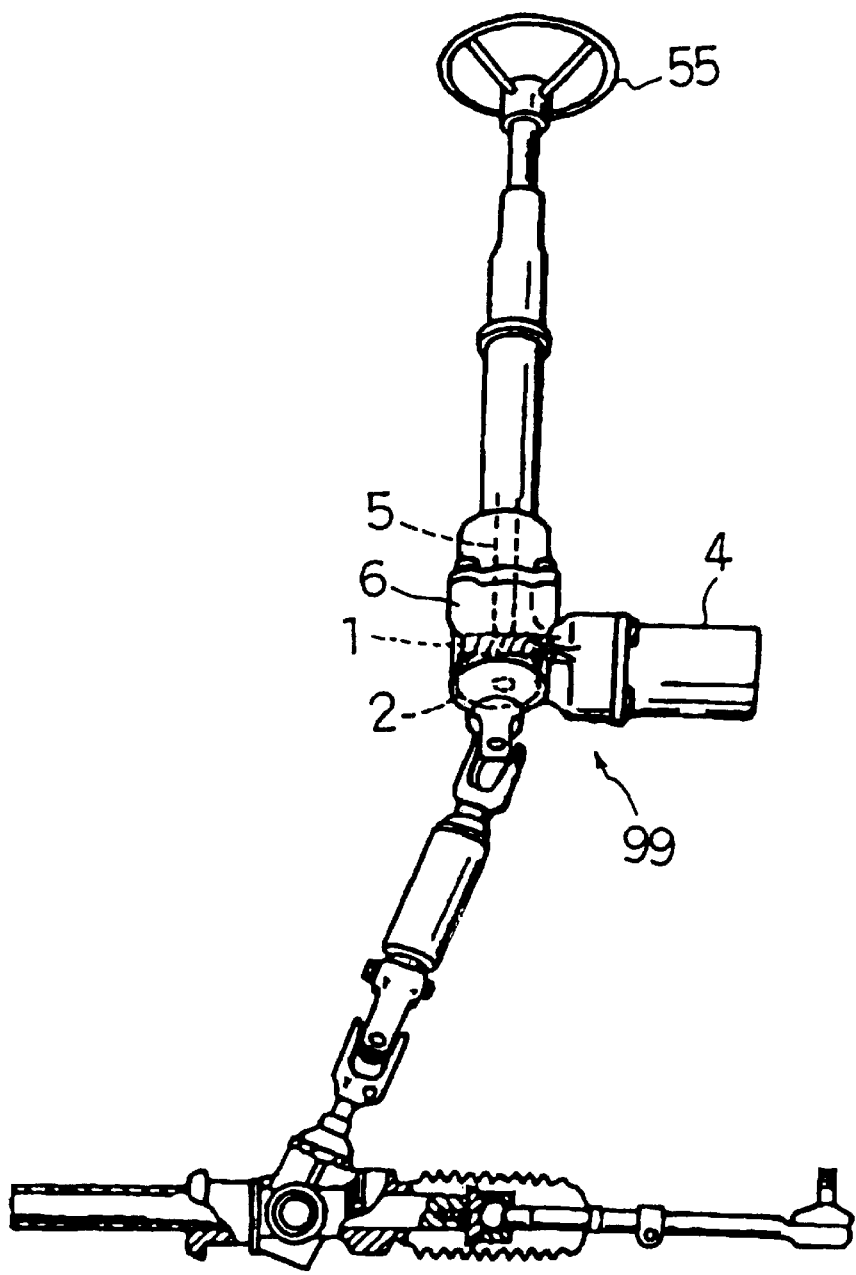
FIG. 4 is a general view showing an electric power steering apparatus in which a power assist section according to the present invention is adopted.

As shown in FIG. 1, a power assist section 99 is composed of a worm shaft 1 power-assisted by an electric motor 4, a wheel gear 2 with which tooth portion 11 of the worm shaft 1 is tooth-engaged and which is attached to a steering shaft 5, and ball bearings 3 and 3' that support both end portions of the worm shaft 1. In a housing 6, there are received the ball bearings 3 and 3', the tooth portion 11 and the wheel gear 2 to form a worm wheel mechanism. The power assist section 99 further includes locknuts 8 and 8' to adjust a backlash in the worm wheel mechanism to be a status close to zero and to give a pre-load to the both ball bearings 3 and 3'. As shown in FIG. 4, the thus-constructed power assist section is integrated into a part of a power steering apparatus.

In detail, the wheel gear 2 is attached to one end of the steering shaft 5 connected with the steering wheel 55, in which the tooth portion 11 of the worm shaft 1 is engaged with the wheel gear 2. Further, the worm shaft 1 is connected with the electric motor 4. The housing is served as a part of a column of the steering apparatus to power-assist a manual operation from the steering wheel 55 in the electric power steering apparatus according to the present invention. Thus, an electric power steering apparatus according to the present invention is formed by providing such a power assist section 55 with a steering apparatus.

Figure 3B:
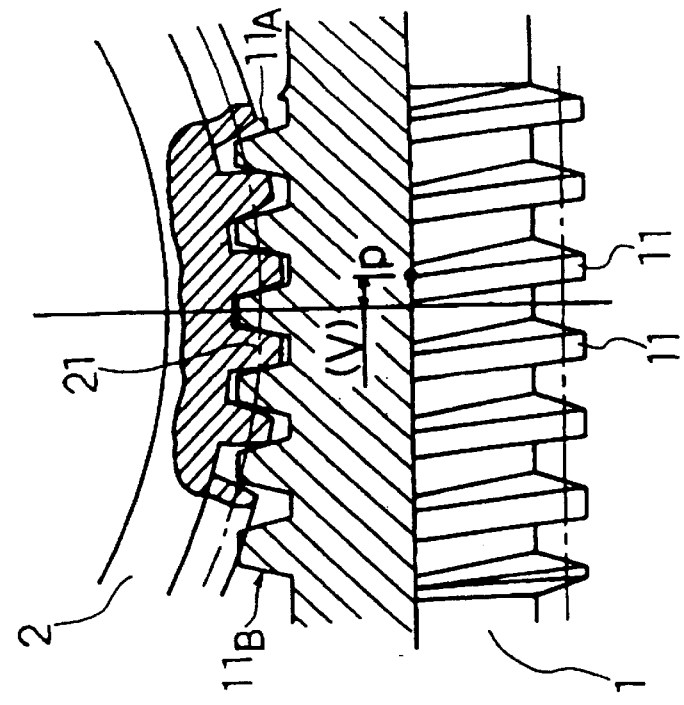
FIGS. 3A and 3B are explanatory views showing a tooth-engagement status in a worm wheel mechanism according to the present invention.
Figure 3A:
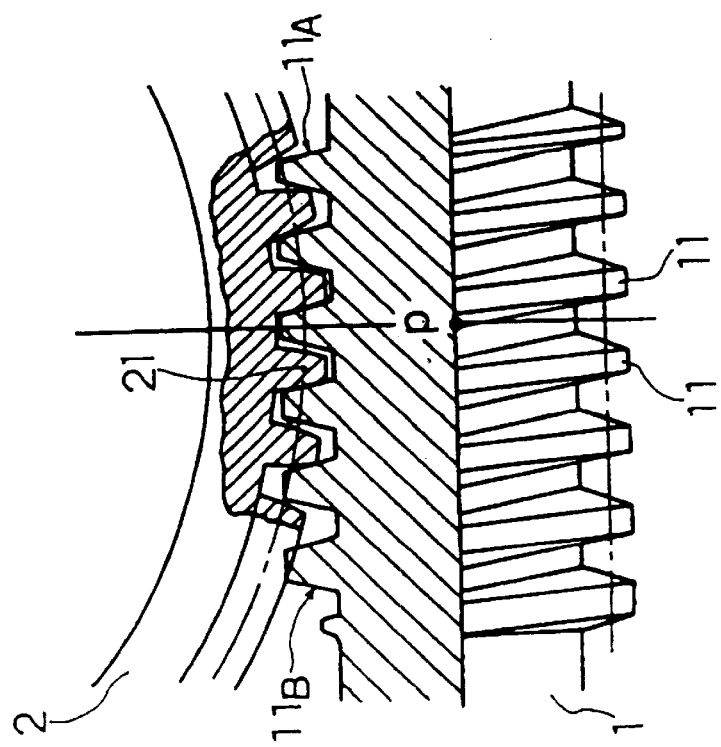

In this basic configuration described above, the tooth portion 11 of the worm shaft 1 constructing a part of the worm wheel mechanism, as shown in FIGS. 3A, 3B, is different in its lead between a front tooth surface (flank) 11A (toward the electric motor 4) and a back tooth surface 11B in a cross-sectional portion of the worm shaft 1 in an axial direction thereof. That is, as shown in FIGS. 3A, 3B, the tooth width at one end of the worm tooth portion 11 is larger than the tooth width at the other end of the worm tooth portion, i.e. in the specific embodiment shown the tooth width gradually narrows or widens along the axial direction of the worm gear. Namely, a compound lead worm is formed on the tooth portion 11 of the worm shaft 1. With this compound lead worm, when the worm shaft 1 is moved by an extremely small distance in the axial direction in a case that the worm shaft is rotatably supported freely, the backlash in an engage portion between the tooth portion 11 and the wheel gear 2 engaged therewith is adjusted to be an optimized status close to zero. Further, an engagement between the tooth portion 11 and the wheel gear 2 is established in a tooth-engagement between the tooth portion 11 and an entire portion of a gear tooth portion 21 by fixing this optimized status. Namely, the backlash in the worm wheel mechanism is maintained to be the optimized status close to zero, so that a rotational motion from the worm shaft 1 can be accurately transmitted to the wheel gear 2, and further to the steering shaft 5.

Besides, an ordinary lead is formed on the gear tooth portion 21 of the wheel gear 2 tooth-engaged with the worm tooth portion 11 of the worm shaft 1. In general, a compound lead is formed on a tooth portion of a wheel gear tooth-engaged with a worm tooth portion of a worm shaft having a compound lead. In this embodiment, the gear tooth portion 21 of the wheel gear 2 is however formed with an ordinary lead that is not a compound lead, so that the machining on the gear tooth portion 21 of the wheel gear can be facilitated.

Figure 2:
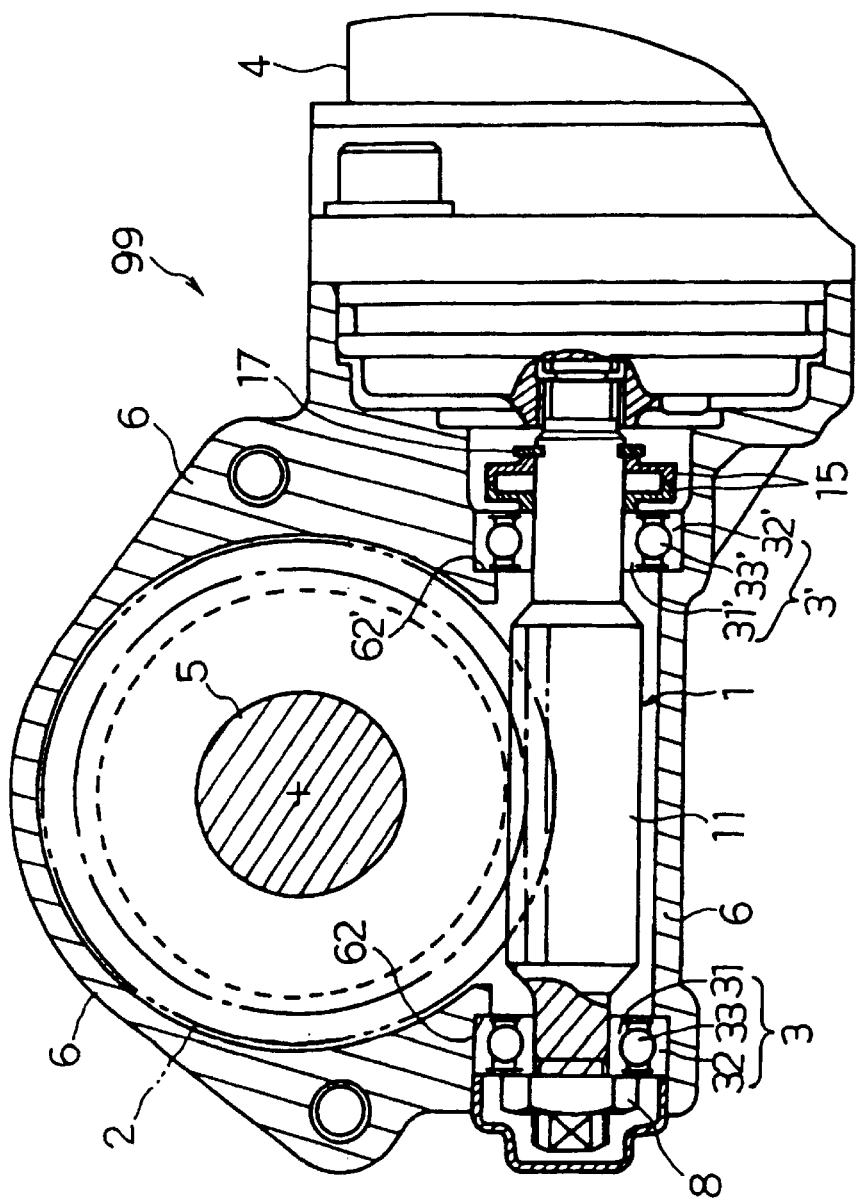
FIG. 2 is an entire cross-sectional view showing an entire construction of a worm wheel mechanism according to another embodiment of the present invention.

The both end of the worm shaft 1 is supported the ball bearings 3 and 3', as referred to FIGS. 1 and 2. The ball bearings 3 and 3' are composed of inner rings 31 and 31', outer rings 32 and 32' and balls 33 and 33' disposed therebetween, respectively. The outer rings 32 and 32' are respectively engaged in its shoulder portions with stepped bores 62 and 62' formed in the housing 6, so that it cannot be prevented from moving in the axial direction. The inner rings 31 and 31 ' are arranged in a condition of binding the worm tooth portion 21, so that the movements in the axial direction thereof can be respectively restrained by the locknuts 8 and 8', as shown in FIG. 1. Further, the movement of the inner rings 31 and 31 ' are restrained in the axial direction by the locknut 8, and that of the inner rings 31 and 31 ' are restrained in an opposite axial direction by a circlip 17 through a disc-shaped spring 15, so that the movement of the worm shaft 1 itself can be restrained in the axial direction.

In the embodiment shown in FIG. 1, the worm shaft 1 is attracted in one axial direction with a clamping operation of one of the locknuts (e.g., the locknut 8) to adjust to be in the optimized status close to zero in backlash. In this status, the other locknut (i.e., 8') is thereafter clamped. With this clamping operation of the locknuts 8 and 8', the pre-load is optimally set in the both ball bearings 3 and 3', so that the worm wheel mechanism can be fixed under a condition that the backlash becomes to be zero as an optimized status.

As a result, noise and the like from the tooth-engagement can be prevented during the operation of the worm wheel mechanism and also, the transmission of a rotational torque, i.e., the transmission of assist power, can be performed smoothly.

Further, the ball bearings 3 and 3' for supporting the worm shaft 1 are respectively fixed at its outer rings 32 and 32' onto the stepped portions of the stepped bores 62 and 62' by the clamping operations of the locknuts 8 and 8', so that its inner rings 31 and 31' can be moved relatively with the stepped portions of the stepped bores 62 and 62'. Namely, at portions where the inner rings 31 and 31 ' are fixed, there is not any stepped portion of the stepped bores 62 and 62', so that the attachment span of the inner rings 31 and 31 ' can be set to be extremely close to a value that is a length of the worm tooth portion 11. As a result, the attachment span of the ball bearings 3 and 3' for supporting the worm shaft 1 can be decreased compared with a conventional worm wheel mechanism used in the electric power steering apparatus. With this decrease of the attachment span of the ball bearings 3 and 3', the power assist section 99 with the housing 6 receiving this worm wheel mechanism can be downsized as a whole, whereby the electric power steering apparatus can be reduced in its weight.

In the embodiment shown in FIG. 2, the worm shaft 1 is moved in one axial direction against a reaction force of the spring 15 with the clamping operation of the locknut 8. By this clamping operation, not only can the backlash in the worm wheel mechanism be set to be at the optimized status close to zero, but also the amount of the pre-loads in the both ball bearings 3 and 3' can be set to be at a predetermined value. Accordingly, both adjustments in backlash and in pre-loads of the ball bearings 3 and 3' can be simultaneously performed by the clamping operation of the locknut 8, so that the assembly of the worm wheel mechanism can be realized efficiently.

Besides, it is mainly explained such an assemble construction in which the outer rings 32 and 32' in the embodiments and however, it is not limited. For example, a case that the inner rings 31 and 31 ' are fixed may be adopted.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric power steering apparatus:
   a wheel gear connected with a steering wheel;
   a worm shaft tooth-engaged with said wheel gear;
   an electric motor rotatably driving said worm shaft;
   at least one locknut provided at a portion of a separate side of the electric motor to fix said worm shaft in an axial direction thereof; and
   a worm tooth portion of said worm shaft formed with a compound lead in which a width of the worm tooth portion is greater at a first end of the worm gear compared to a width of the worm tooth portion at a second end, opposite of the first end, of the worm gear.

2. An electric power steering apparatus according to claim 1, wherein
one end of said worm shaft is rotatably supported through a ball bearing and is fixed by said at least one locknut in the axial direction of said worm shaft, and
the other end of said worm shaft is rotatably supported through another ball bearing and is fixed by a circlip through a disc-shaped spring in the axial direction.

3. An electric power steering apparatus according to claim 1 or 2, wherein only respective outer rings of the ball bearings are secured to a housing in which said worm shaft and said wheel gear are disposed.

4. An electric power steering apparatus according to claim 1 or 2, wherein a gear tooth portion of said wheel gear is formed with an ordinary lead that is not the compound lead.

5. An electric power steering apparatus according to claim 3, wherein a gear tooth portion of said wheel gear is formed with an ordinary lead that is not the compound lead.

6. An electric power steering apparatus according to claim 3, wherein the housing is configured as a part assisted by a column of the steering wheel.

\* \* \* \* \*